United States Patent [19]

Everhart

[11] 3,758,729

[45] Sept. 11, 1973

[54] LINE CARD CIRCUIT FOR DUAL STATION CONTROL

[75] Inventor: Charles T. Everhart, Santa Ana, Calif.

[73] Assignee: San/Bar Electronics Corp., Santa Ana, Calif.

[22] Filed: Dec. 6, 1971

[21] Appl. No.: 205,099

[52] U.S. Cl. .......... 179/99

[51] Int. Cl. .......... H04m 3/22

[58] Field of Search .......... 179/99, 81, 84, 18 BE

[56] References Cited

UNITED STATES PATENTS

| | | | |
|---|---|---|---|
| 3,055,985 | 9/1962 | Peterson | 179/99 |
| 3,649,772 | 3/1972 | Fitzsimons et al. | 179/99 |
| 3,436,488 | 4/1969 | Barbato et al. | 179/99 |
| 3,331,924 | 7/1967 | Reaves | 179/99 |

*Primary Examiner*—Kathleen H. Claffy
*Assistant Examiner*—Kenneth D. Baugh
*Attorney*—Harold L. Jackson et al.

[57] ABSTRACT

A line card circuit for a telephone system that operates to permit each of a pair of physically distant subscriber stations to exercise full control over a telephone circuit, is disclosed. The telephone system would include a pair of subscriber stations each having a key telephone unit that is equipped to have a corresponding line card circuit. The line card circuits are both connected to a central office via the telephone circuit formed by a single pair of conventional line conductors. The line card circuits are further interconnected for dual station control and include circuitry that is responsive to ringing signals for enabling simultaneous ringing at both telephone stations. Further included in each line card circuit is circuitry to permit both subscriber stations to exercise full supervisory control over the telephone circuit, for example, by placing or answering calls at either subscriber station and placing the line conductors in a hold condition or removing the conductors from such hold condition. Also included is circuitry which provides for the simultaneous display of visual indicators at both subscriber stations.

25 Claims, 2 Drawing Figures

LINE CARD CIRCUIT FOR DUAL STATION CONTROL

BACKGROUND OF THE INVENTION

1. Field of the Invention

This invention generally relates to a circuit intended for use in telephone systems. More specifically, the present invention concerns a line card circuit usable with key telephone systems for permitting a pair of mutually distant key telephone subscriber stations to exercise full supervisory control over a telephone circuit.

2. Description of the Prior Art

Telephone users sometimes desire to have the capability of exercising full supervisory control over a key telephone circuit (identified by a single telephone number) from two key telephone units respectively placed at distant subscriber stations. This would involve having each of the two key telephone units capable of receiving and placing calls over the telephone circuit wherein each of the key telephone units is capable of placing the telephone circuit in a hold condition or retrieving the telephone circuit therefrom. Operation of either of the key telephone units must be appropriately indicated at the other key telephone unit.

From a practical standpoint, this simply means that a first key telephone unit could be placed in a businessman's office while a second key telephone unit is placed in a different location such as his home. Both the business phone and the home phone would be connected to permit complete use from either the office or the home. Clearly, this provides the advantage of having both phones attended when the businessman subscriber is at either of the subscriber stations (home or office) where key telephone units are installed. This dual station capability would be desirable for many reasons besides having both the phones attended more frequently. For example, where a home phone number is unlisted, the subscriber could still be reached at home by callers dialing the office phone number. Further, business calls could be readily placed over the business lines, and so charged by the telephone company, from a subscriber's home.

At present, there is no convenient way to satisfy the above-described requirement of having two telephone units each capable of exercising control over a common telephone circuit when the telephone units are situated at distant locations. The closest analogy is the familiar network of key telephone units installed at a single subscriber station or location, i.e., in an office, to permit a telephone call to be answered at any of the key telephone units. In this familiar type of arrangement, a single telephone circuit is provided with a number of key telephone units which are connected in parallel at the subscriber station. Unfortunately, the conventional arrangement cannot be employed where the telephone units are at two distant locations, rather than at a single location, due to the line resistances involved.

Accordingly, it is the intention of the present invention to provide an improved line card circuit that may be employed to provide a key telephone system wherein a telephone circuit is fully controlled from two or more subscriber stations that are mutually distant.

SUMMARY OF THE INVENTION

Briefly described, the present invention involves a line card circuit usable with key telephone systems to permit two or more mutually distant key telephone units to each command full supervisory control over a telephone circuit.

More particularly, the subject line card circuit which is designed to permit dual station control, includes ringing circuitry for simultaneously sensing ringing signals at two distant subscriber stations; circuitry for permitting calls to be answered at, or placed from, either of the two subscriber stations; holding circuitry for permitting either of the subscriber stations to place the telephone circuit in, or retrieve the circuit from, a hold condition; and circuitry for enabling the simultaneous presentation of visual signals, at both subscriber stations, which signals indicate the operating status of the telephone circuit.

The objects and many attendant advantages of the invention will be more readily appreciated as the same becomes better understood by reference to the following detailed description which is to be considered in connection with the accompanying drawings in which like reference symbols designate like parts throughout the figures thereof.

DESCRIPTION OF THE PREFERRED EMBODIMENT

Figure 1:
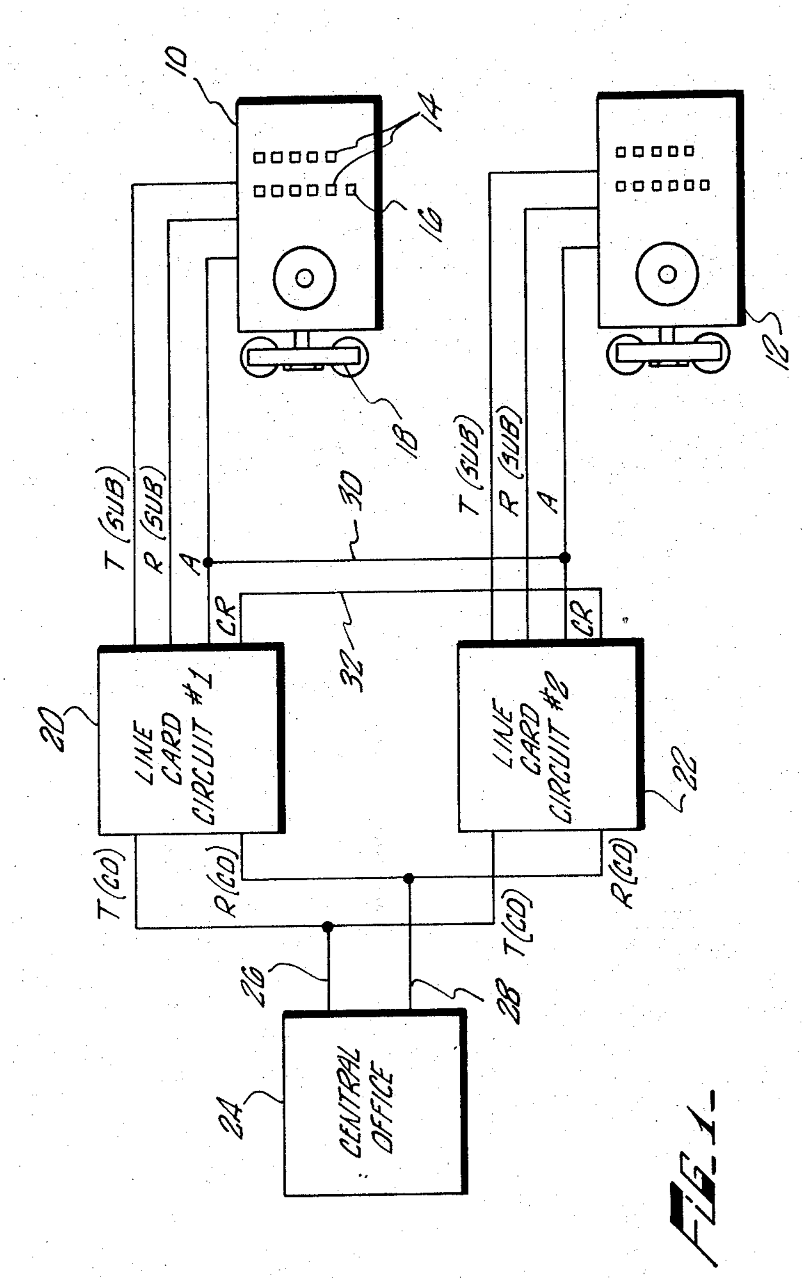
FIG. 1 is a general block diagram illustrating a key telephone system in which line card circuits, in accordance with the present invention, have been incorporated to provide dual station control.

Referring now to FIG. 1, a key telephone system adapted for dual station control would generally include a pair of subscriber stations 10 and 12 each serviced by at least one key telephone unit having one or more of the usual line buttons 14, a hold button 16, and a receiver 18. A line card circuit is provided for each telephone circuit terminating at the subscriber stations. Otherwise stated, where a line button 14 corresponds to a single telephone circuit having a specific telephone number, one line card circuit would be required for each line button 14. If two telephone circuits were serviced by a key telephone unit, then two line buttons and two line card circuits would be required.

Accordingly, the subscriber stations 10 and 12 are respectively connected to have corresponding line cards 20 and 22. A standard pair of telephone lines, commonly referred to as tip and ring conductors and respectively designated in FIG. 1 as T(sub) and R(sub) connect the line card circuits 20 and 22 to the subscriber stations 10 and 12.

A conductor commonly known as the "A" lead also extends between the standard key telephone unit and its corresponding line card. The "A" lead is typically connected to the hold button available on the key telephone unit and also to the receiver hook switch.

The line card circuits 20 and 22 are customarily situated at the subscriber station in somewhat close proximity to the key telephone unit to which it corresponds. In a dual station control system, the line card circuits 20 and 22, in accordance with the present invention, would both be connected to a central office 24 by a common pair of tip and ring line conductors 26 and 28. The line card circuits 20 and 22 are also connected to each other by a pair of conductors 30 and 32. The conductor 30 serves to interconnect the "A" leads extending between the line card circuits and their respective key telephone units. The conductor 32 serves as a common ringing connection to provide common ringing and button light control for incoming telephone calls directed to the stations 10 and 12.

It has been found that a permissable distance between the two subscriber stations 10 and 12 can range up to a distance of 1000 ohms for each of the conductors 30 and 32. This distance easily accommodates the ordinarily 1200 ohms loop resistance permitted where no relay, loop extender, or other long line equipment is used to connect a subscribed station to a central office facility. Accordingly, the requirement for the conductors 30 and 32 presents no limitation on the unassisted operating distance between a central office and a subscriber station.

Operationally, the dual station control made possible by the line card circuits 20 and 22, in accordance with the present invention, enables telephone subscribers to have telephone calls placed from, or received at, either of the two physically distant locations which may, for example, be a person's home and office. Accordingly, calls directed at the subscriber stations 10 and 12 would produce the usual ringing and flashing button light familiar to most telephone users. The button light stops flashing but remains illuminated upon the incoming call being answered at either, or both, of the subscriber stations 10 and 12. Such answering is accomplished by the receiver 18 being lifted off-hook concurrently with depression of the line button 14 corresponding to the telephone circuit over which the telephone call is being received. Where both the subscriber stations 10 and 12 answer the incoming call, or are otherwise on-line, the telephone use may be characterized as a conference call.

The telephone circuit may be placed in a hold condition by depression of the hold button 16 when either of the key telephone units is in use. The hold condition would be indicated at both stations by a winking of the line button light. A telephone circuit in a hold condition may be retrieved by either of the key telephone units at the respective subscriber stations 10 and 12.

When conference calls are in session, placing a telephone circuit in a hold condition would require that both of the key telephone units have the hold button 16 depressed. In the alternative, at least one hold button 16 must be depressed and be accompanied by the return of the remaining telephone unit to an on-hook condition. Retrieval of the telephone circuit would continue to be possible by either of the key telephone units. This hold operation is explained in greater detail hereinafter.

Figure 2:
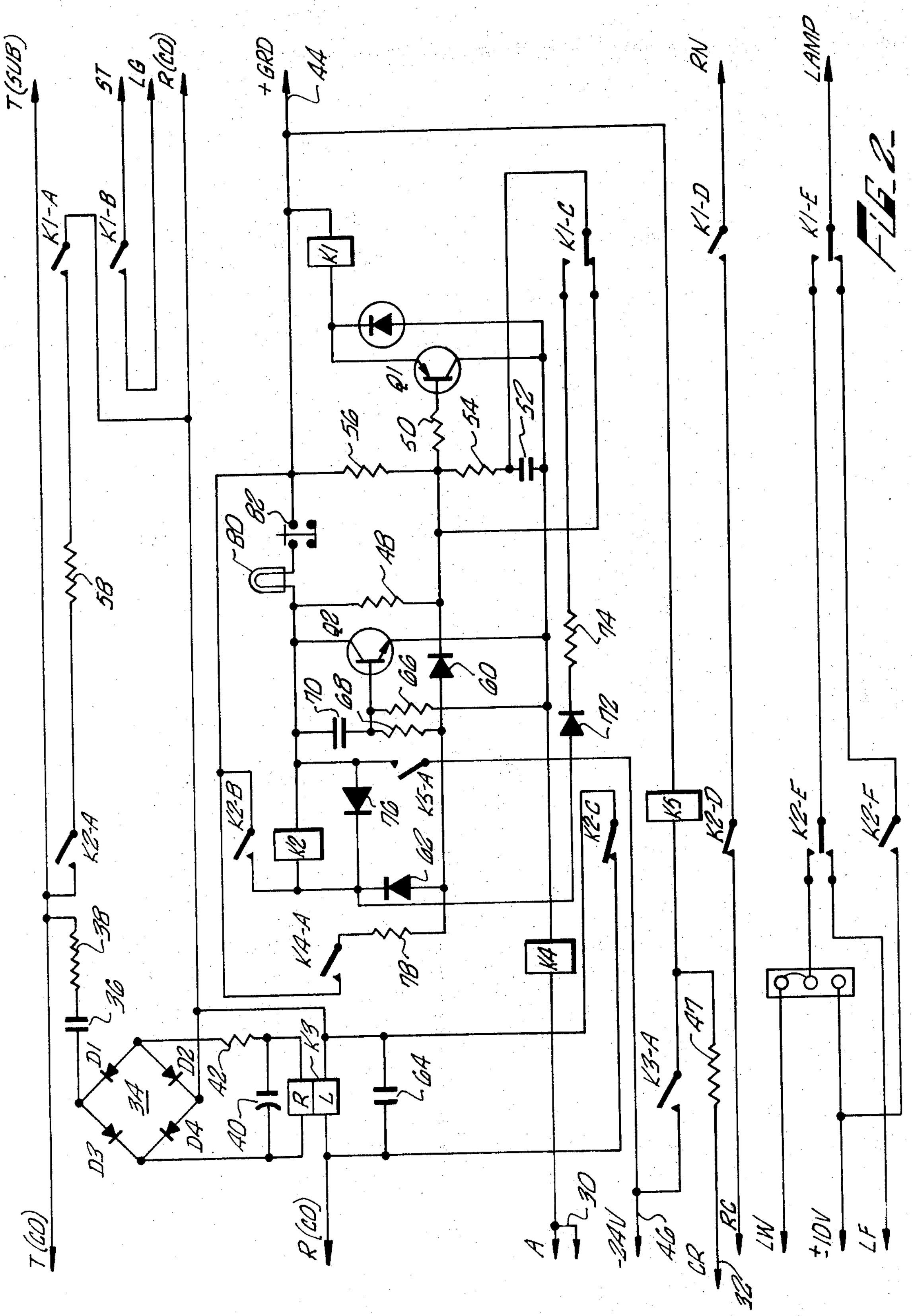
FIG. 2 is a detailed schematic diagram of a line card circuit for dual station control in accordance with the present invention.

A line card circuit designed to provide dual station control is illustrated by the detailed schematic diagram of FIG. 2. As shown, the line card circuit includes five individual relays of which three perform primary operational functions in the line card while the remaining two relays contribute to dual station control. Each of these relays include a coil, or coils, and one or more contacts which are shown in corresponding relationship in FIG. 2 by being vertically aligned. For example, the relay coil K1, when energized, operates the relay contacts designated K1–A through K1–E.

Specifically, the relays performing major operational functions have been designated K1, K2 and K3. The relay K1 generally operates to enable ringing, and associated light control, at a subscriber station in response to ringing signals transmitted from a central office for incoming calls. The relay K1 also operates to place the telephone circuit in a hold condition in response to the appropriate manipulation of the hold button on a key telephone unit. The relay K2 essentially operates in response to a subscriber being "on-line." For the purposes of this description, a subscriber is "on-line" when the receiver of the key telephone unit at the subscriber station is off-hook concurrently with the appropriate line button on the key telephone unit being depressed. The relay K2 also serves to prepare the line card circuit to have the telephone circuit placed in a hold condition when the relay K1 is energized. The relay K3 serves as a switching relay and essentially operates to energize the line card circuit in response to either ringing current from the central office or the flow of line current attendant to a subscriber being "on-line."

The remaining two relays designated K4 and K5 serve to make possible the dual control of the telephone circuit by two or more subscriber stations. Specifically, these relays K4 and K5 allow the simultaneous presentation of ringing signals and control of light indicators at subscriber stations 10 and 12. The relays K4 and K5 also permit the respective key telephone units at the stations 10 and 12 to place the telephone circuit in a hold condition or retrieve it therefrom.

The line card circuit can be best understood by reviewing the operation of individual components therein with respect to the familiar functions of a telephone, such as receiving incoming calls, placing outgoing calls, and placing the telephone circuit in a hold condition or retrieving it therefrom.

INCOMING CALLS

Incoming calls are usually initiated by the transmission from a central office, PBX, or the like, of ringing signals over the tip and ring conductors extending therefrom. These tip and ring conductors extending between the central office and each of the line card circuits 20 and 22 have been designated T(CO) and R(CO). Ringing signals are characterized by alternating currents flowing through the tip T(CO) and ring R(CO) conductors and are detected by a rectifier bridge 34 including four diodes D1, D2, D3 and D4. These four diodes D1–D4 are connected in a standard bridge configuration to provide direct current signals at a pair of output terminals in response to the application of alternating current signals to the input terminals thereof. These direct current signals produced by the rectifier bridge 34 serve to energize the relay K3 by the flow of current through a first coil R thereof.

A capacitor 36 is connected at an input terminal of the bridge 34 to prevent the flow of DC line current through the bridge when the telephone circuit is completed and a conversation is being conducted thereon. A resistor 38 is connected in series with the capacitor 36 to provide a high impedance to audio signals. The combination of a capacitor 40 and resistor 42 are connected in the output circuit of the bridge 34 as a tank circuit to prevent "chattering" of the relay K3 by periodic zero signal levels of the ringing signals.

Energization of the relay K3 produces closure of the associated relay contact K3–A to complete a connection from a positive voltage or ground terminal 44 to a negative voltage (−24v.) terminal 46 through the relay K5. The relay K5 is thereby energized.

Closure of the relay contact K3–A also provides a conductive path from the negative terminal 46 to the ground terminal of the companion line card via a resistor 47 and the interconnecting conductor 32. The relay K5 of the companion line card circuit is accordingly also energized by closure of the relay contact K3–A. Otherwise stated, closure of the contact K3–A of either line card circuit will produce energization of the relay K5 of both companion line card circuits.

Closure of the contact K5–A (of both companion line card circuits) applies negative potential to the base terminal of a transistor Q1 via a path that may be traced from the negative terminal 46 through the closed contact K5–A, a resistor 48, and a resistor 50. The transistor Q1 is thereby rendered conductive by the resulting discharge of a capacitor 52 through a resistor 54 which combination is serially connected between the base and collector terminals of the transistor Q1. A resistor 56 serves to appropriately bias the emitter terminal of the transistor Q1 with respect to the base terminal thereof.

Conduction by the transistor Q1 energizes the relay K1 to produce operation of the relay contacts K1–A through K1–E. Specifically, closure of the contact K1–A places the telephone circuit in a hold condition by connecting a holding resistor 58 between the tip and ring conductors whenever a contact K2–A is also closed. Since the contact K2–A is not closed during ringing, closure of the contact K1–A is of no effect during the ringing period.

Operation of the contact K1–B interconnects a standard pair of terminals ST and LG which allows operation of the motor of a standard interruptor, which is well known, and therefore not necessarily described in detail herein. Briefly, however, an interruptor may include a motor which drives a series of cams which in turn periodically operate a number of mechanical switches which produce the desired lamp operation and audible signalling at a key telephone unit. Further in this connection, the type of ringing is controlled by the application of a conventional ringing control voltage from a terminal RC through a normally closed contact K2-D and the closed contact K1–D to a terminal RN to energize an audible signal generator, i.e., bell, buzzer, etc., at the subscriber station and which may be mounted in the key telephone unit.

Lamp control signals are provided from a trio of lamp control terminals designated LW, ± 10v, and LF. Accordingly, the line button lamp on a key telephone unit is made to commence flashing for incoming calls by having the operated contact K1–E connect the lamp flashing control terminal LF to the lamp terminal L through a double position normally positioned contact K2–E and the operated contact K1–E. As is later explained, the line button lamp is caused to assume a steady illuminated state when the telephone circuit has been seized and caused to wink during a hold condition by operation of the contacts K1–E, K2–E and K1–F.

The remaining contact K1-C that corresponds to the relay K1 serves to assist in the switching of the transistor Q1 to a non-conductive state when a subscriber is on-line (the telephone circuit is seized).

With the receiver of the telephone unit being converted to an off-hook condition and the appropriate line button depressed, in response to the audible ringing and visually observable flashing of the line button light, ground potential is applied to the "A" lead. The relay K4 is thus energized and the corresponding contact K4–A is closed. Removal of the ground potential from the "A" lead will allow the relay K4 to be de-energized. The relay K3 is concurrently maintained energized by the flow of line current through the coil L thereof.

The conductor 30, which interconnects the "A" leads of the companion line card circuits, permits the ground potential to be concurrently applied to the relay K4 of the companion line card circuit to have the contact K4–A thereof also closed. The resulting controls and presentation of indicating signals are accordingly provided by the companion line card circuits in duplicate.

Closure of the contact K4–A removes the negative potential from the base terminal of the transistor Q1 by having the ground terminal 44 connected thereto through the contact K4–A, a protective diode 60 and the base resistor 50. The transistor Q1 is accordingly rendered non-conductive in accordance with the RC time constant provided by the resistors 54 and 56 and the capacitor 52. The relay K1 is thus de-energized and the contacts thereof revert to unoperated positions to have the light flashing and ringing cease.

Closure of the contact K4–A also permits ground potential to be applied to energize the relay K2 via a path from the ground terminal 44, through the contact K4–A, a diode 62, the relay K2 and the closed contact K5–A to the negative potential terminal 46. The associated relay contacts K2–A through K2–F are thus operated. Specifically, closure of the contact K2–A connects the hold resistor 58 to the tip conductor connected between the central office and the subscriber station and thereby primes the line card circuit for being placed in a hold condition upon later closure of the contact K1–A. The closed contact K2–B provides an alternate ground path from the ground terminal 44 to the relay K2 such that the relay K2 will remain energized whenever removal of the ground potential from the "A" lead during a hold condition causes de-energization of the relay K4 and opening of the contact K4–A. The contact K2–C connects a capacitor 64 in parallel with the relay coil L of the relay K3 to provide an audio bypass for audio or talk signals. The contact K2–D is opened and operates to disconnect the ringing control terminal RC and maintain the disconnection for the duration of a telephone usage once the line is seized. Audible ringing signals are thereby prevented from occurring when the relay K1 is energized by a subscriber placing the telephone circuit in a hold condition. The contacts K2–E and K2–F, as earlier mentioned, control the operation of the line button lamp. When the contact K2–F is closed, a steady lamp signal is applied to the lamp terminal through the contact K1–E which is in a normal position (illustrated) during line seizure. The contact K2–E is operated to close a connection to a winking signal terminal such that for a hold condition, a winking signal will be applied to the lamp through the operated contact K2–E and the reoperated contact K1–E.

The telephone circuit connection now being completed (the line being seized), a telephone conversation may take place in an ordinary fashion. The line button lamp will remain steadily illuminated until the subscribers at both companion stations go off-line.

HOLD CONDITION

To place the telephone circuit in a hold condition, the hold button on the key telephone unit is depressed. This hold button is connected to the "A" lead and when depressed removes the ground potential therefrom. The relay K4 is thus de-energized and the contact K4–A is opened to remove the ground potential from the base terminal of the transistor Q1. The transistor Q1 is as a result again rendered conductive by the negative potential applied to the base terminal thereof through the closed contact K5–A and the relay K1 is accordingly energized.

Closure of the contact K1-A thus connects the holding resistor 58 to the ring conductor connected between the central office and a subscriber station. Since the contact K2–A is now also closed, the resistor 58 bridges the tip and ring conductors to have the telephone circuit placed in a hold condition. Ringing is prevented by the open contact K2–D; but the line button lamp commences to wink as a result of the winking signal provided from the winking lamp terminal LW through the operated contacts K2–E and K1–E.

The telephone circuit is retrieved from a hold condition by a release of the hold button on the key telephone unit of either the companion subscriber stations. This again applies ground potential to the "A" lead to have the transistor Q1 again become non-conductive and the relay K1 de-energized.

In the event that the calling, or distant, party hangs up or otherwise abandons a call when the telephone circuit is in a hold condition, the flow of line current ceases. The relay K3 is accordingly de-energized and the consequent opening of the contact K3–A causes the subsequent de-energization of the relay K5 which is followed by de-energization of the relays K2 and K1 due to the opened contact K5–A. This series of events is duplicated in the companion line card circuit since the opening of the contact K3–A also removes the negative potential applied over the conductor 32 to the companion circuit.

OUTGOING CALLS

A subscriber can place an outgoing call by depressing the appropriate line button and converting his telephone unit receiver to an off-hook condition to become on-line. Line current will accordingly flow through the loop formed by the interconnected tip and ring conductors and through the coil L of the relay K3 which accordingly is energized. Consequent closure of the contact K3–A energizes the relay K5 of both companion line card circuits. The relay K4 will also be energized by the application of ground potential to the "A" leads of both the companion line card circuits. The closed contacts K5–A and K4–A permit energization of the relay K2 which is typically evidenced by the steady illumination of the line button lamp on the key telephone unit. No ringing occurs at the telephone unit.

The closed contact K4–A prevents triggering of the transistor Q1 to conduction but also primes a transistor Q2 to be rendered conductive in the event that the contact K5–A is opened while the contact K4–A remains closed. This combination can occur when the central office 24 is replaced by a private branch exchange (PBX) for which calls are initiated through an operator with whom an outside telephone number is requested. The operator may typically place the telephone circuit in a "PBX hold" condition while the request is executed.

This "PBX hold" condition may totally disconnect the subscriber tip and ring conductors from the PBX. The flow of line current would cease and the relay K3 would be de-energized to have the contact K3–A opened and followed by de-energization of the relay K5 and opening of the contact K5–A. If the relay K2 were to be permitted to also become de-energized, the steady illumination of the line button lamp would cease even while the party placing the call remains on-line. The calling party may then get the impression that he has "lost" the operator.

To prevent any such difficulty, the relay K2 is maintained energized by the transistor Q2 which, when conductive, provides an alternate path to the negative terminal 46. A pair of resistors 66 and 68 serve to properly bias the terminals of the transistor Q2 to have the transistor Q2 become conductive whenever the contact K5–A is opened and the contact K4–A remains closed. The line button lamp will therefor remain properly lit until the PBX operator reconnects the subscriber.

The telephone circuit may, once seized, be replaced in a hold condition from either station in the manner earlier described. It is noted that if only one subscriber station is in use, then the hold operation is as earlier described. If, however, both stations are simultaneously on-line, then either both hold buttons must be depressed or one station must be returned to an on-hook condition while the hold button of the on-line station is appropriately depressed. This is necessary due to the need for removing ground potential from the "A" leads to permit a hold condition. Clearly, if either station is on-line, a ground potential would be applied to the "A" leads of both companion stations and a hold condition would be impossible.

For outgoing calls, as with incoming calls, the line button lamps at the companion stations 10 and 12 (FIG. 1) will be controlled simultaneously and will both go off when both the subscribers are off-line and the line card circuits are permitted to be restored to an idle condition.

By way of example, but not in a limiting sense, elements having the below enumerated values may be used in a line card circuit for dual station control in accordance with the present invention:

| | |
|---|---|
| Resistors 38, 42 | 1.5 kilohms |
| Resistor 47 | 2 kilohms |
| Resistor 50 | 470 ohms |
| Resistor 54 | 1 kilohm |
| Resistor 56 | 75 kilohms |
| Resistor 58 | 120 ohms |
| Resistor 66 | 150 kilohms |
| Resistor 68 | 3 kilohms |
| Resistor 74 | 100 ohms |
| Resistor 78 | 47 ohms |
| Capacitor 36 | 2 microfarads |
| Capacitor 40 | 15 microfarads |
| Capacitor 52 | 47 microfarads |
| Capacitor 64 | 65 microfarads |
| Capacitor 70 | 0.01 microfarads |
| Diodes | Type IN4002 |
| Transistor Q1 | Type SB10027 |
| Transistor Q2 | Type 2N3569 |
| Relays K1, K2 | Type LB0042500 |
| Relay K3 | Type MRMX1063 |
| Relays K4, K5 | Type PRB2009H |

A busy lamp 80 and a switch 82 may be used to allow repairmen to readily determine if the telephone circuit connected through a line card circuit is being used. The lamp 80 is connected to become illuminated by operation of the switch 82 if the telephone circuit is being used. The lamp and switch combination may be replaced by a light emitting diode, or the like, if desired.

It is to be understood that although only the use of two subscriber stations has been described in the foregoing description, that a greater number of stations may be employed.

From the foregoing it is now apparent that the present invention provides an improved line card circuit for use with key telephone systems to enable two or more subscriber stations to exercise complete control over a telephone circuit and have the operating stations of the telephone line indicated by concurrent operation of the line button lamps at all companion subscriber stations.

While a preferred embodiment of the present invention has been described hereinabove, it is intended that all matter contained in the above description and shown in the accompanying drawings be interpreted as illustrative and not in a limiting sense and that all modifications, constructions and arrangements which fall within the scope and spirit of the present invention may be made.

What is claimed is:

1. A line card circuit for use with telephone systems including two or more companion key telephone units which are each adapted to have full supervisory control over a telephone circuit common to both key telephone units, and a pair of line conductors connecting each key telephone unit to said telephone circuit through one of a number of companion line card circuits corresponding to the number of companion key telephone units, ringing signals and line current being applied to said key telephone units over said line conductors which are adapted to be interconnected at any of said key telephone units by operation thereof, each said line card circuit comprising:

first means including a first relay for energizing said line card circuit in response to either said ringing signals or the flow of said line current through a pair of line conductors coupled thereto;

second means for energizing companion line card circuits in response to operation of said first means;

third means for enabling ringing at a key telephone unit corresponding to said line card circuit in response to said ringing signals;

fourth means responsive to the operation of said corresponding key telephone unit for enabling the presentation of visual operation indicators at said corresponding key telephone unit; and fifth means for enabling the concurrent presentation of said visual operation indicators at companion key telephone units in response to operation of said corresponding telephone unit.

2. The line card circuit defined by claim 1 wherein said first relay includes first and second coils and a contact, said first coil being adapted to be energized in response to the presence of ringing signals, said second coil being adapted to be energized in response to the presence of line current, said contact being operated in response to the energization of either of said first and second coils.

3. The line card circuit defined by claim 2, said second means including means responsive to operation of said contact for providing energizing signals to companion line card circuits.

4. The line card circuit defined by claim 1 wherein said third means includes a second relay and said fourth means includes a third relay, said line card circuit further comprising sixth means including said second and third relays for connecting an impedance between said pair of line conductors coupled thereto to have said pair of line conductors maintained in a hold condition.

5. The line card circuit defined by claim 4 further comprising means for maintaining said third relay, once energized, in an energized condition for as long as said corresponding key telephone unit is operated.

6. The line card circuit defined by claim 1, said first means further including a rectifier connected between said pair of line conductors coupled thereto for causing operation of said first relay in response to the presence of said ringing signals.

7. The line card circuit defined by claim 1, wherein voice signals are applied to said pair of line conductors coupled thereto when said key telephone unit corresponding to said line card circuit is used, said first relay including a first coil operatively connected between said pair of line conductors coupled thereto and a second coil connected in one of said pair of line conductors coupled thereto, said first coil being connected to be energized in response to the application of ringing signals, said second coil being energized by said flow of line current.

8. The line card circuit defined by claim 6 further including means for rendering said second coil insensitive to said voice signals.

9. The line card circuit defined by claim 1, said second means including means connected to said first means for providing an energizing signal to companion line circuits in response to operation of said first means.

10. The line card circuit defined by claim 1, said first means including means for providing a status signal to said companion line card circuits in response to the operational status of said corresponding key telephone unit.

11. The line card circuit defined by claim 1, further including means for energizing said line card circuit in response to the application thereto of energizing signals from a companion line card circuit.

12. A telephone line circuit for use with a key telephone system including two or more companion key telephones which are each intended to mutually have full supervisory control over the key telephone system, each key telephone being connected to a central facility via a line circuit and a pair of line conductors that are parallel connected to said central facility, each key telephone having a hold button, said key telephone system having a ringing condition during which ringing signals are simultaneously applied to the line conductors of the companion key telephones, a seize condition characterized by the line conductors of at least one key telephone being interconnected by operation of the key telephone corresponding thereto, and a hold condition characterized by the connection of a holding impedance across the line conductors of each companion key telephone in response to operation of the hold button on at least one key telephone, line current being applied to said line conductors of an operated key telephone during said seize and hold conditions, a telephone line circuit comprising:

ringing means for controlling ringing at a key telephone connected thereto;

a pair of line leads corresponding to, and adapted to be connected in, the pair of line conductors for said key telephone;

first means for detecting ringing signals applied to said line conductors during said ringing condition and for controlling said ringing means to provide ringing at said key telephone connected thereto, said first means being connected between said pair of line leads;

second means for detecting the flow of line current in said pair of line leads during said seize and hold conditions to control the ringing means to prevent ringing at said key telephone connected thereto, said second means connected in one of said pair of line leads; and third means adapted to be connected to the telephone line circuits of companion key telephones for detecting any seize and hold conditions produced by operation of a companion key telephone.

13. The telephone line circuit defined by claim 12 further comprising holding means for producing a hold condition, said holding means including:

a holding impedance; and first and second switches connected in series with the holding impedance, the first and second switches serving to connect the holding impedance between said pair of line leads when both first and second switches are operated.

14. The telephone line circuit defined by claim 13, said third means including means for detecting initiation of a hold condition by any of the companion key telephones in said key telephone system to have said holding means responsive to operation of each of the companion key telephones in said system.

15. The telephone line circuit defined by claim 14, said first means including:

ringing signal detector means for detecting said ringing signals applied to said line conductors; and a first relay, operated by said ringing signal detector means for controlling said ringing means to provide ringing at said key telephone connected thereto, said first relay also operated in response to operation of the hold button for operating the first switch of the holding means;

said second means including:

line current detector means for detecting the flow of line current in said pair of line leads, and a second relay operated by said line current detector means for controlling said ringing means to prevent ringing at said key telephone connected thereto and for operating the second switch of the holding means, whereby the hold condition is only produced by concurrent operation of both first and second relays.

16. The telephone line circuit defined by claim 15, said third means further including means for detecting the operation of said line current detector means of any telephone line circuit in said key telephone system to have said second relay operated to control said ringing means in response to the flow of line current being detected in any of the pair of line leads included in companion telephone line circuits.

17. The telephone line circuit defined by claim 16 wherein said key telephone system also includes a ringer and a power source adapted to be controllably interconnected through said ringing means to provide a ringing at a key telephone connected thereto, said ringing means including:

a ringing conductor for controllably interconnecting the ringer and the power source; and third and fourth switches connected in series in said ringing conductor for individually completing or breaking the continuity of the ringing conductor, said third switch being operated by said first relay to complete the continuity of said ringing conductor to allow interconnection of said ringer and power source by the ringing conductor, said fourth switch being operated by said second relay to break the continuity of the ringing conductor to prevent interconnection of the ringer and power source by the ringing conductor.

18. The telephone line circuit defined by claim 17, said line current detector means including a third relay having first and second relay coils of which a first coil is connected in one of said pair of line leads to be operated by the flow of line current in said line leads, said third relay releasing the telephone system from said hold condition in response to a polarity reversal across said line conductors.

19. The telephone line circuit defined by claim 18, said ringing signal detector means including said third relay and a rectifier connected between said pair of line leads for causing operation of said third relay in response to said ringing signals.

20. A telephone line circuit for use with key telephone systems including two or more key telephones each equipped with a telephone line circuit and which mutually have full supervisory control over each other, visual and audio indicators indicative of such supervisory control being simultaneously presented at each key telephone, said telephone line circuit comprising:

detector means for detecting the operation of any key telephone in said key telephone system, said detector means enabling presentation of indicator signals representative of the status of such operation of any key telephone, the detector means of all corresponding telephone line circuits in said system being adapted to be interconnected.

21. The telephone line circuit defined by claim 20 wherein said key telephones are operated to place said telephone system in a seize or hold condition, said detector means including:

first means for receiving a ground signal for the duration of any seize condition effected by operation of a key telephone in said system; and second means for receiving a negative battery signal for the duration of any seize or hold condition effected by operation of a key telephone in said system.

22. A telephone line circuit for use in a telephone system including two or more key telephones each of which is equipped with hold and line buttons, each key telephone being connected via one of said telephone line circuits to a central facility by a pair of line conductors, said key telephone system having a ringing condition during which ringing signals are transmitted from said central facility to each key telephone via said line conductors, a seize condition characterized by a pair of line conductors being interconnected by operation of a key telephone connected thereto, and a hold condition characterized by the connection of a holding impedance between a pair of line conductors in response to operation of the hold button of the key telephone connected thereto, said telephone line circuits operating to permit each key telephone included in said system to exercise full control of visual and/or audio ring, seize and hold indicators which are operated at each key telephone to respectively indicate said ring, seize and hold conditions, said telephone line circuit comprising:

first means for causing actuation of said seize indicators at the key telephone connected to the telephone line circuit in response to a seize condition implemented at any key telephone in said telephone system; and second means for causing actuation of said hold indicators at the key telephone connected to the telephone line circuit in response to a hold condition implemented by operation of any key telephone in said telephone system.

23. The telephone line circuit defined by claim 22, said first means including a relay adapted to be connected to the line button of each of the key telephones in said system to be energized by the operation of any of said line buttons.

24. The telephone line circuit defined by claim 22, said second means including a relay connected to be energized whenever a hold condition is implemented by operation of any key telephone in said system.

25. The telephone line circuit defined by claim 22 wherein said first means includes a first relay that is connected to be energized for the duration of any seize condition produced by operation of a key telephone in said system, and said second means includes a second relay that is connected to be energized for at least the duration of any hold condition produced by operation of a key telephone in said system.

* * * * *